United States Patent Office 3,392,131
Patented July 9, 1968

3,392,131
SALTS OF ETHYLENE CROTONIC ACID
COPOLYMER AS AN EMULSIFYING
AGENT
Charles E. Miles, Ballwin, and Harry P. Holladay, Creve
Coeur, Mo., assignors to Monsanto Company, St. Louis,
Mo., a corporation of Delaware
No Drawing. Filed Mar. 4, 1965, Ser. No. 437,281
24 Claims. (Cl. 260—28.5)

This invention relates to emulsifiable compositions and to stable aqueous emulsions thereof. More particularly, this invention relates to emulsifiable compositions comprising water-immiscible organic materials of the nature of organic solvents, oils, waxes, asphalt and synthetic resins and a salt of an ethylene-crotonic acid copolymer as an emulsifying agent.

The term "E/CA" as used herein means ethylene-crotonic acid.

Water-immiscible materials such as thermoplastic hydrocarbons and synthetic resins have found widespread use in the general areas of protective coatings and adhesive laminates. In many applications they are applied in the form of a hot melt. Application by hot melt has been faced with considerable difficulty because the molten substance cannot always easily be made available at places where it is desired to effect treatment with such materials.

Attempts have been made to incorporate thermoplastic hydrocarbons and synthetic resins in media capable of fluid flow so that application will not be dependent upon available heating means. For this purpose aqueous emulsions of thermoplastic hydrocarbons such as petroleum waxes and asphalt, and synthetic resins have been developed. However, since a water-immiscible material, such as those mentioned, does not by itself readily form an emulsion in aqueous medium it has been necessary to use an emulsifying agent. The emulsifying agents which have been used in the art, although effective as emulsifying agents, do not enhance the physical properties of the water-immiscible materials being emulsified and may actually prevent the use of the emulsions in some applications. In an attempt to improve the physical properties of water-immiscible materials, e.g. petroleum waxes and asphalt, various synthetic polymers, e.g. polyethylene and polyvinylacetate, have been incorporated therein. However, these blends also require an emulsifying agent which may prevent their use in some applications.

Now in accordance with this invention it has been found that aqueous emulsions of water-immiscible organic materials can be prepared through the use of an emulsifying agent which is an E/CA copolymer salt. These emulsions are particularly valuable since in many cases the E/CA copolymer salt enhances the physical properties of the water-immiscible organic material in addition to rendering the water-immiscible organic material emulsifiable. The aqueous emulsions of this invention are characterized by good stability and good shelf life over a wide range of solids content. Furthermore when the ammonium salt of an E/CA copolymer is used as emulsifying agent, no residue of emulsifying agent remains because the ammonia evaporates simultaneously with the water when the emulsion is applied and allowed to dry.

The E/CA copolymers used to form the E/CA copolymer salts useful as emulsifying agents in this invention generally contain about 5%–40% by weight of polymerized crotonic acid. E/CA copolymers containing more than 40 weight percent polymerized crotonic acid, e.g. amounts up to 75 weight percent polymerized crotonic acid, may be used but such higher amounts are not required and offer no particular advantages. E/CA copolymers containing less than about 5 weight percent polymerized crotonic acid are generally ineffective for the purposes of this invention since the emulsifying characteristics of the salts thereof are relatively low.

Crotonic acid content as used herein has reference to that part of the copolymer derived from crotonic acid monomer and is determinable by analysis of the copolymer. The E/CA copolymers used in the present invention ordinarily have number avverage molecular weights in the range of 500 to 5000 or even 15,000 as determined by standard osmometric procedures. The E/CA copolymer may contain, in addition to ethylene and crotonic acid, a small amount, e.g. up to about 15 weight percent or more, of one or more other polymerizable ethylenically unsaturated monomers such as vinyl chloride, acrylonitrile, acrylamide, vinyl acetate and the like.

The copolymerization of ethylene and crotonic acid to form E/CA copolymers, the salts of which render water-immiscible materials emulsifiable in accordance with this invention, may be carried out batchwise or continuously in the presence of a catalyst such as an organic peroxide, e.g. tertiary butyl hydroperoxide, at a pressure from 500 to 40,000 p.s.i. and at a temperature of —60° C. to 300° C. A tubular reactor, stirred autoclave or other equipment capable of withstanding the high pressures required for copolymerization may be used. These copolymers and process of making them are more fully described in copending application S.N. 149,564 filed Nov. 2, 1961, now abandoned and assigned to the assignee of the present invention.

As mentioned above, E/CA copolymers containing about 5%–75% by weight polymerized crotonic acid may be used to form the E/CA salts useful as emulsifying agents in this invention, but it is not necessary that the total polymerized crotonic acid content thereof be present in the salt form. The E/CA salts which have been found useful in accordance with this invention are those E/CA copolymers which contain about 5%–75% by weight polymerized crotonic acid in salt form and 0–70% by weight polymerized crotonic acid in acid form, the total amount of polymerized crotonic acid being about 5%–75% by weight. It is preferred to use E/CA copolymers containing at least about 15 weight percent polymerized crotonic acid in the salt form since E/CA copolymers containing less than about 15 weight percent polymerized crotonic acid in the salt form must be used together with an additional emulsifying agent.

The following examples will serve to illustrate the present invention. Parts and percent are by weight unless otherwise indicated.

Typical properties of some of the E/CA copolymers applicable for use in the present invention are indicated in Table 1.

TABLE 1

| E/CA (type) | CA [1] | Specific Viscosity [2] | M.P., ° C. |
|---|---|---|---|
| A | 2.7 | 0.267 | 85–89 |
| B | 5.5 | 0.46 | 104–108 |
| C | 8.5 | 0.112 | 65–67 |
| D | 8.7 | 0.120 | 68–70 |
| E | 9.4 | 0.245 | 112–114 |
| F | 9.5 | 0.132 | 70–72 |
| G | 17.6 | 0.169 | 64–66 |
| H | 18.1 | 0.081 | 56–58 |
| I | 19.5 | 0.134 | 60–62 |
| J | 20.8 | 0.081 | 53–55 |
| K | 24.6 | 0.098 | 53–55 |
| L | 29.4 | 0.064 | 54–56 |
| M | 35.8 | 0.035 | <25 |

[1] Wt. percent polymerized crotonic acid content of the E/CA copolymer.
[2] Measured at 1% by weight of copolymer in xylene at 105° C. Specific viscosity as used herein means the (viscosity of solution-viscosity of solvent)/viscosity of solvent.

Examples 1–10 (Table 2)

The stable aqueous emulsions of Examples 1–10 are prepared by the following general procedure. The E/CA copolymer and the material to be emulsified are melted together and the molten solution added slowly to water at a water temperature of about 90° C. In Example 1 the neutralizing agent is added to the molten solution prior to the addition of the solution to water. In Examples 2–10 the neutralizing agent is added to the water prior to the addition of the molten solution. In Examples 1–8 a commercial "Ultrasonic S-75 Sonifier" sound wave device is used at power level eight for 3–5 minutes to prepare the emulsions. In Examples 9 and 10, stable emulsions form merely with hand stirring. The paraffin wax used in Examples 1, 5, 9 and 10 has an M.P. of 141–143° F. Further details are given in Table 2 hereinafter.

Example 22

A portion of the emulsion of Example 18 is coated on Kraft paper at a dry coat weight of 15 lbs./ream (3000 sq. ft.) and allowed to dry. The smooth coating is flexible and exhibits improved adhesion over paraffin wax coatings. The remaining portion of the emulsion of Example 18 is applied as floor wax to a vinyl tile floor. The coating buffs to high gloss and has good water resistance.

Example 23

The emulsion of Example 2 is coated on Kraft paper at a dry coat weight of 15 lbs./ream (3000 sq. ft.) and

| Example | E/CA Copolymer | | | Material Emulsified | Parts | Neutralizing Agent | Parts | Water (parts) | Emulsion |
|---|---|---|---|---|---|---|---|---|---|
| | Type | CA[1] | Parts | | | | | | |
| 1 | L | 29.4 | 33 | Paraffin Wax Resin[2] | 33 33 | Morpholine | 7 | 120 | Yes. |
| 2 | I | 19.5 | 30 | Asphalt[3] | 70 | NH₄OH | 20 | 100 | Yes. |
| 3 | L | 29.4 | 30 | ___do___ | 70 | NH₄OH | 20 | 100 | Yes |
| 4 | L | 29.4 | 30 | Resin[4] | 70 | NH₄OH | 20 | 150 | Yes. |
| 5 | I | 19.5 | 20 | Paraffin Wax | 80 | NaOH | 20 | 150 | Yes. |
| 6 | I | 19.5 | 30 | Microcrystalline Wax, M.P. 190–195° F. | 70 | NH₄OH | 20 | 150 | Yes. |
| 7 | I | 19.5 | 30 | Carnauba Wax | 70 | NH₄OH | 20 | 150 | Yes. |
| 8 | G | 17.6 | 50 | Asphalt[5] | 50 | NH₄OH | 20 | 150 | Yes. |
| 9 | K | 24.6 | 30 | Paraffin Wax | 70 | NH₄OH | 20 | 150 | Yes. |
| 10 | M | 35.8 | 30 | ___do___ | 70 | NH₄OH | 20 | 150 | Yes. |

[1] Wt. percent polymerized crotonic acid content of the E/CA copolymer.
[2] Piccopale S-100. A tradename of Pennsylvania Industrial Chemical Corp. for a hard, solid resin of dienes and reactive olefines with average molecular weight of 1,100 and ball and ring softening point of 100° C.
[3] Smackover Asphalt; ASTM needle penetration of 160 mm. (5 sec., 100 gm. 77° F.).
[4] (Resin PR 937-10-1) a petroleum residue consisting of condensed ring (3 rings or greater) aromatic hydrocarbons and their alkyl derivatives. Softening point, 123° F. ASTM penetration of 28 mm. (5 sec., 100 gm. 77° F.)
[5] Smackover Asphalt; ASTM needle penetration of 90 mm. (5 sec. 100 gm. 77° F.)

Examples 11–20 (Table 3)

In Examples 11–20, the E/CA copolymer and material to be emulsified are melted together and the molten mixture added to water with hand stirring at a water temperature of about 90° C. The neutralizing agent is added to the water prior to the addition of the molten mixture. Hand stirring is sufficient to form the emulsions which form. The paraffin wax used in Examples 11–16, 18 and 20 has an M.P. of 141–143° F. Results and further details are given in Table 3.

allowed to dry. As the coating dries, the odor of ammonia is detected. Thus there is no residue of emulsifying agent remaining after the coating dries. The E/CA-Smackover Asphalt coating has improved flexibility and water resistance as compared to a Smackover Asphalt (160) coating alone. The resulting coating also has a lower ASTM penetration value and a higher softening point, respectively, than Smackover Asphalt (160).

| Ex. | E/CA Copolymer | | | Material Emulsified | Parts | Neutralizing Agent | Parts[2] | Nonionic Emulsifier | Parts | Water (parts) | Emulsion |
|---|---|---|---|---|---|---|---|---|---|---|---|
| | Type | CA[1] | Parts | | | | | | | | |
| 11 | A | 2.7 | 50 | Paraffin Wax | 50 | NH₄OH | 100 | Brij 30[4] | 10 | 250 | No. |
| 12 | B | 5.5 | 20 | ___do___ | 80 | NH₄OH | 100 | Tergitol NPX[5] | 20 | 250 | Yes. |
| 13 | D | 8.7 | 20 | ___do___ | 80 | NH₄OH | 100 | Brij 30 | 4 | 250 | Yes. |
| 14 | E | 9.4 | 20 | ___do___ | 80 | KOH | 10 | Tergitol NPX | 30 | 300 | Yes. |
| 15 | F | 9.5 | 50 | ___do___ | 50 | NH₄OH | 100 | Brij 30 | 10 | 250 | Yes. |
| 16 | C | 8.5 | 50 | ___do___ | 50 | Diethylamine | 20 | ___do___ | 10 | 250 | Yes. |
| 17 | E | 9.4 | 50 | Petroleum Oil SAE 140. | 100 | KOH | 20 | Tergitol NPX | 30 | 400 | Yes. |
| 18 | E | 9.5 | 50 | Paraffin Wax Piccolyte S115[3] | 50 50 | KOH | 20 | ___do___ | 30 | 400 | Yes. |
| 19 | E | 9.4 | 50 | ___do___ | 100 | KOH | 20 | ___do___ | 30 | 400 | Yes. |
| 20 | None | | | Paraffin Wax | 100 | None | | ___do___ | 50 | 400 | No. |

[1] Wt. percent polymerized crotonic acid content of the E/CA copolymer.
[2] 20 percent aqueous solutions.
[3] The trade name of Pennsylvania Industrial Chemical Corp. for a terpene resin having a softening point of 115° C. and a molecular weight of about 1,200.
[4] A condensation product of lauryl alcohol and ethylene oxide, Atlas Chemical Co.
[5] A nonyl phenyl polyethylene glycol ether containing 10.5 mols of ethylene oxide, product of Union Carbide Corporation.

Example 21

(1) 30 parts E/CA (Type L)
(2) 20 parts E/CA (Type H)
(3) 70 parts Smackover Asphalt (ASTM penetration of 90 mm.)
(4) 60 parts KOH (20% aqueous solution)
(5) 60 parts water A mixture of (1), (2) and (3) are melted together in a vessel and a solution of (4) and (5) are added thereto with hand stirring. A stable emulsion forms within about 1 minute.

Example 21 illustrates that emulsions can be formed by adding the aqueous phase to the water immiscible phase and that mixtures of the E/CA copolymer salts can be used to form the emulsions in accordance with this invention.

Example 24

The emulsion of Example 5 is coated on Kraft paper at a dry coat weight of 15 lbs./ream (3000 sq. ft.) and allowed to dry. The resulting Na-E/CA wax coating exhibits improved hardness, flexibility and adhesion as compared to a paraffin wax coating alone.

Example 25

Three parts sodium chloride are added to 100 parts of an aqueous paraffin wax emulsion containing 0.7 part paraffin wax (M.P. 141–143° F.) and 0.3 part ammonium-E/CA copolymer (Type J). The aqueous paraffin wax emulsion remains stable and is not effected by the presence of the sodium chloride.

Illustrated by the above examples is that the E/CA copolymer salts of this invention will emulsify a wide variety of water-immiscible organic materials. Also illustrated is that in addition to serving as emulsifying agents, the E/CA copolymer salts improve the properties of the water-immiscible thermoplastic hydrocarbons. Furthermore, when ammonium salts of E/CA copolymers are used to emulsify water-immiscible organic materials in accordance with this invention, the resulting composition after the emulsion has dried contains no possibly deleterious residue since the ammonia evaporates simultaneously with the water as is illustrated by Example 23.

Normally the amount of E/CA copolymer salt employed will be about 20 to 100 parts by weight for each 100 parts by weight of water-immiscible material. Amounts greater than this may be used but such amounts are not generally required. Preferably, about 30 to 50 parts of E/CA copolymer salt will be used. The optimum concentration varies depending primarily upon the material to be emulsified although other factors such as speed and type of agitation have effects also. The highest proportion of E/CA copolymer salt may not be the optimum; hydrocarbon oils and organic solvents, for example, require relatively less E/CA copolymer salt emulsifying agent.

This invention is not limited to any particular salt of an E/CA copolymer. In general the applicable E/CA copolymer salts are the Group I metal salts as given in The Handbook of Chemistry and Physics, 29th ed. (1945) at p. 312, such as lithium, sodium, potassium, copper, and silver and the amine salts. In general any compound which is a hydrogen acceptor can be employed to neutralize E/CA copolymers and form salts thereof. The preferred neutralizing agents include by way of example the alkali metal hydroxides such as sodium hydroxide and potassium hydroxide; ammonium hydroxide; organic amines such as the primary, secondary and tertiary alkyl and hydroxyalkyl amines containing up to about 10 carbon atoms in each alkyl group, e.g. methylamine, ethylamine, n-propylamines, isobutylamine, n-hexylamine, diethylamine, diisopropylamine, triethylamine, triethanolamine, methyldiethylamine and the like; aryl, aralkyl and alkaryl amines such as aniline, 2-aminobiphenyl, 1-naphthylamine, O-methylaniline, 2,3-dimethylaniline, cumidine, O-methoxyaniline, benzylamine, phenethylamine, dimethylaniline and the like; heterocyclic amines such as pyridine, morpholine, 2-aminopyridine, pyrazine, oxazine, oxazole and the like; and alicyclic amines such as cyclohexylamine and dicyclohexylamine. Mixtures of these neutralizing agents may be used if desired.

An excess amount of neutralizing agent can be used although as noted hereinbefore such amounts are not generally required in the preparation of E/CA copolymer salts applicable in this invention. Illustrative of this is an E/CA copolymer containing 30 weight percent polymerized crotonic acid of which only 50% thereof has been neutralized. Such a copolymer contains 15 weight percent polymerized crotonic acid in acid form and 15 weight percent polymerized crotonic acid in salt form and is entirely applicable in this invention.

The E/CA copolymers can be neutralized to the salt form either prior to or during formation of the emulsions. The salt may be prepared by melting the E/CA copolymer in a vessel either in the presence or absence of a solvent, adding the neutralizing agent while stirring, cooling the resulting E/CA copolymer salt and storing until use. It is preferred, however, to neutralize the E/CA copolymer at the time the aqueous emulsions are prepared.

The present invention is not limited to any particular method of preparing the emulsions. Direct addition of the material to be emulsified and molten E/CA copolymer or salt thereof to water at a temperature of about the melting point of the copolymer is a satisfactory method of producing the emulsions. However, the emulsions may also be prepared by adding water to the material to be emulsified and E/CA copolymer or salt thereof in molten form. Where the emulsions are prepared with E/CA copolymers which have not been neutralized, one or more neutralizing agents must be present. The neutralizing agent is usually added to the water although it may be added to the melt or to both the melt and the water. Under conditions requiring the use of an additional emulsifier, such emulsifier is usually added to the water phase.

Any method of providing agitation during the period of addition may be used. For example, any commercial colloid mill homogenizer, high speed stirring device or commercial sound wave device effecting localized mixing at the point of addition of the melt and water can be used to prepare the emulsions. Moreover, in certain cases mere hand stirring is sufficient for production of stable emulsions.

Stable emulsions of a wide variety of water-immiscible materials and mixtures thereof can be prepared with E/CA copolymer salts in accordance with this invention. Waxes which can be emulsified in accordance with the present invention include by way of example vegetable waxes such as carnauba wax, ouricury wax, candelilla wax, sugar cane wax and Esparto wax; animal and insect waxes such as beeswax and Chinese insect wax; mineral waxes such as Montan wax and Ozakerite; synthetic waxes such as the paraffin-type waxes prepared by the Fischer-Tropsch synthesis of hydrocarbons, the esters of polyhydric alcohols prepared by esterifying ethylene glycol, diethylene glycol, polyethylene glycol, or sorbitol, for example, with stearic acid, the chlorinated paraffin and naphthalene waxes, and the various oxidized and esterified Montan waxes known as Gersthofen waxes, and the petroleum waxes such as paraffin wax and microcrystalline wax. Mixtures of these waxes may be used if desired.

By "paraffin wax" is meant the hard crystalline hydrocarbon waxes such as are formed from mineral oils of the mixed base or paraffinic base type, or from shale oils, or the Fischer-Tropsch synthesis of hydrocarbons. The melting point of paraffin waxes contemplated ranges, e.g. between 90° F. to 160° F. with the majority of commercial paraffin waxes having a melting point of 120° F. to 150° F. by "microcrystalline wax" is meant both the hard and soft microcrystalline waxes such as those prepared, e.g. by conventional solvent deoiling of petrolatum from a Midcontinent crude oil or a Pennsylvania crude oil. Microcrystalline waxes generally have a melting point of 100° F.–180° F. The relatively soft microcrystalline waxes useful in the present invention may be identified as those microcrystalline waxes having a 100 gm. A.S.T.M. needle penetration at 77° F. of about 17 mm. to 30 mm. or more. The relatively hard microcrystalline waxes useful have a 100 gm. A.S.T.M. needle penetration at 77° F. of 10–17 mm.

Asphalts in general can be emulsified according to this invention. It will be understood that the term "asphalt" as used herein is intended to include natural asphalt, blown asphalt, petroleum asphalt and the like bitumens.

Stable emulsions of numerous water-immiscible synthetic resins can be emulsified according to the present invention. Thermosetting resins emulsifiable according to the present invention include phenol-aldehyde, cresol, and other alkyl phenol-aldehyde condensation products; aldehyde condensation products of urea, methylol urea, methylated urea and other alkylated ureas obtained by condensing urea with a saturated aliphatic alcohol and formaldehyde; aldehyde condensation products of melamine and alkylated melamines; alkyd resins and copolymers of vinyl compounds with unsaturated alkyd resins. Thermoplastic resins which can be emulsified by means of the emulsifying agents of the present invention include polyvinyl compounds such as polystyrene, polymers and copolymers of vinyl compounds such as vinyl chloride and vinyl acetate; thermoplastic, phenol-aldehyde resins such as phenol-acetaldehyde and phenol-furfural resins; and esters of rosin with polyhydric alcohols such as glycerol and pentaerythritol.

Stable emulsions of a wide variety of miscellaneous water-immiscible materials other than those classed as resins, waxes and asphalt can be emulsified according to the present invention. Examples of these miscellaneous materials include hydrocarbon oils, mineral oils, fatty oils, organic solvents and the like.

Stable emulsions of mixtures of the above-mentioned water-immiscible organic materials can be prepared according to the present invention and under certain conditions emulsions of mixtures of these water-immiscible materials is preferred. For example, when emulsifying water-immiscible resins a problem is sometimes encountered when the melt viscosity of the resin is such that it is not easily workable at a temperature at or below the boiling point of water at atmospheric pressure. The problem is obviated by adding waxes, petroleum oils or organic solvents to the resin melt thereby reducing the melt viscosity so that it is workable by using pressurized emulsification equipment and forming the emulsions at pressures above atmospheric.

As mentioned hereinbefore when an E/AC copolymer containing about 5% to 15% by weight of polymerized crotonic acid in salt form is used a small amount of an additional emulsifier is required to form the emulsion. The proportion of additional emulsifier relative to the water-immiscible material content of the emulsion is advantageously about 5 to 15% by weight. Greater amounts can be used if desired but such amounts are not generally required.

The additional emulsifying agent component of the system can be selected from a wide variety of available anionic or nonionic materials. Representative anionic emulsifying agents are sodium oleate, sodium stearate, ammonium oleate, triethanolamine stearate, monoethanolamine stearate, ammonium laurate, sodium or potassium salts of tall oil or rosin, and the various high molecular weight amines and amine salts.

Representative nonionic emulsifying agents which can be used in accordance with the present invention are polyoxyethylene derivatives of e.g. alcohols, acid, ethers, phenols, amides or amines, a large number of which are commercially available. They generally satisfy one of the following formula:

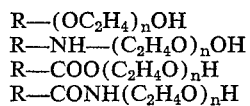

$$R—(OC_2H_4)_nOH$$
$$R—NH—(C_2H_4O)_nOH$$
$$R—COO(C_2H_4O)_nH$$
$$R—CONH(C_2H_4O)_nH$$

wherein R is an aliphatic, aryl or alkaryl hydrocarbon radical and $n$ is an integer of 6 to 30.

Among commercially available nonionic emulsifying agents which can be used in accordance with the present invention there may be mentioned the product "Alphenyl" which corresponds to the first of the aforementioned formula in which R is the butylphenylene radical and $n$ is 8, said product resulting from the condensation of about 8 mols of ethylene oxide with one mol of butyl phenol and the "Polyrad" products which correspond to the second of said formula wherein R—NH is the residue of rosin amine (dehydroabiethylamine) R—NH$_2$. In "Polyrad 1100," e.g. the integer $n$ is equal to 11. "Emulphor A" and "Ethofat 6060" are trade names of products which correspond to the third formula, RCOO— being the residue of oleic acid in the former and stearic acid in the latter. Finally "Tergitol NPX" and "Brij 30 are trade names of products corresponding to the first formula in which R is the residue of nonyl phenol and lauryl alcohol, respectively.

The aqueous emulsions of this invention may include in addition to the water-immiscible substances, E/CA copolymer salt and water, pigments which may be any one or combination of commercial pigments such as ball clay, china clay, soapstone, ground limestone, carbon black and fly ash. The pigment depending on the use to which the emulsion is to be put may vary widely. Thus if the emulsion is to be dried to a resulting film which is to be exposed to an ambient atmosphere of acidic nature the pigment may be slate flour, mica or powdered tile. If the emulsion is to be applied to steel it may be that the pigment may be an inhibiting oxide or carbonate, such as lead oxide or lead chromate. The emulsions of this invention may also contain any of the various stabilizing and viscosifying agents for emulsions as is well known in the art.

The emulsion compositions of this invention find numerous uses in diverse areas. The aqueous petroleum wax emulsions are advantageously used in the coating and laminating technologys. Illustrative uses may be found in the waxed paper wraps and liners for food packages and the like such as bread, frozen food and breakfast food, in the coating of paper milk containers and drinking cups and in the various laminated paper compositions.

The aqueous asphalt and resin emulsions may be used in road paving, roofing, water proof protective coatings, laminates and adhesives.

The aqueous emulsions of this invention when used as a coating may be applied by any of the conventional means such as dipping, brushing, spreading, painting, spraying and the like.

What is claimed is:

1. A composition capable of being dispersed in water to form an emulsion therewith, said composition comprising (1) a water-immiscible organic material selected from the group consisting of oil, wax, asphalt and synthetic resin and (2) an emulsifying agent selected from the group consisting of (a) an ethylene-crotonic acid copolymer salt having a number average osmotic molecular weight from about 500 to 15,000 and containing about 15% to 40% by weight of polymerized crotonic acid content as the salt of a neutralizing agent selected from the group consisting of alkali metal hydroxide, ammonium hydroxide and organic amine and (b) an ethylene-crotonic acid copolymer salt having a number average osmotic molecular weight from about 500 to 15,000 and containing about 5% to 15% by weight of polymerized crotonic acid content as the salt of a neutralizing agent selected from the group consisting of alkali metal hydroxide, ammonium hydroxide and organic amine together with an additional emulsifying agent selected from the group consisting of anionic emulsifier and polyoxyethylene nonionic emulsifier, said ethylene-cronotic acid copolymer salt being present in an amount of at least about 20 weight percent based on the weight of water-immiscible organic material present.

2. A composition capable of being dispersed in water to form an emulsion therewith, said composition comprising (1) a water-immiscible organic material selected from the group consisting of oil, wax, asphalt and synthetic resin and (2) at least about 20 weight percent based on the water-immiscible organic material of an ethylene-crotonic acid copolymer salt having a number average osmotic molecular weight from about 500 to 15,000 and containing about 15% to 40% by weight of polymerized crotonic acid content as the salt of a neutralizing agent selected from the group consisting of alkali metal hydroxide, ammonium hydroxide and organic amine.

3. A composition capable of being dispersed in water to form an emulsion therewith, said composition comprising (1) a water-immiscible organic material selected from the group consisting of oil, wax, asphalt and synthetic resin and (2) an ethylene-crotonic acid copolymer salt having a number average osmotic molecular weight from about 500 to 15,000 and containing about 5% to 15% by weight of polymerized crotonic acid content as the salt of a neutralizing agent selected from the group consisting of alkali metal hydroxide, ammonium hydroxide and organic amine together with an additional emulsifying agent selected from the group consisting of anionic emulsifier and polyoxyethylene nonionic emulsifier, said ethylene-crotonic acid copolymer being present in an amount of at least about 20 weight percent based on the weight of water-immiscible organic material present.

4. The composition of claim 1 wherein said water-immiscible material is a petroleum wax.

5. The composition of claim 1 wherein said water-immiscible material is asphalt.

6. The composition of claim 1 wherein the ethylene-cronotic acid copolymer salt is an alkali metal salt.

7. The composition of claim 1 wherein the ethylene-crotonic acid copolymer salt is an amine salt.

8. The composition of claim 1 wherein the ethylene-crotonic acid copolymer salt is the ammonium salt.

9. An emulsion of a water-immiscible organic material in water comprising (1) a water-immiscible organic material selected from the group consisting of oil- wax, asphalt and synthetic resin, (2) water and (3) as an emulsifying agent therefor a member selected from the group consisting of (a) an ethylene-crotonic acid copolymer salt having a number average osmotic molecular weight from about 500 to 15,000 and containing about 15% to 40% by weight of polymerized crotonic acid content as the salt of a neutralizing agent selected from the group consisting of alkali metal hydroxide, ammonium hydroxide and organic amine and (b) an ethylene-crotonic acid copolymer salt having a number average osmotic molecular weight from about 500 to 15,000 and containing about 5% to 15% by weight of polymerized crotonic acid content as the salt of a neutralizing agent selected from the group consisting of alkali metal hydroxide, ammonium hydroxide and organic amine together with an additional emulsifying agent selected from the group consisting of anionic emulsifier and polyoxyethylene nonionic emulsifier, said ethylene-cronotic acid copolymer salt being present in an amount of at least about 20 weight percent based on the weight of water-immiscible organic material present.

10. An emulsion of a water-immiscible organic material in water comprising (1) a water-immiscible organic material selected from the group consisting of oil, wax, asphalt and synthetic resin, (2) water and (3) as an emulsifying agent therefor at least about 20 weight percent of an ethylene-crotonic acid copolymer salt having a number average osmotic molecular weight from about 500 to 15,000 and containing about 15% to 40% by weight of polymerized crotonic acid content as the salt of a neutralizing agent selected from the group consisting of alkali metal hydroxide, ammonium hydroxide and organic amine.

11. An emulsion of a water-immiscible organic material in water comprising (1) a water-immiscible organic material selected from the group consisting of oil, wax, asphalt and synthetic resin, (2) water and (3) as an emulsifying agent therefor an ethylene-crotonic acid copolymer salt having a number average osmotic molecular weight from about 500 to 15,000 and containing about 5% to 15% by weight of polymerized crotonic acid content as the salt of a neutralizing agent selected from the group consisting of alkali metal hydroxide, ammonium hydroxide and organic amine together with an additional emulsifying agent selected from the group consisting of anionic emulsifier and polyoxyethylene nonionic emulsifier, said ethylene-crotonic acid copolymer salt being present in an amount of at least about 20 weight percent based on the weight of water-immiscible organic material present.

12. The emulsion of claim 9 wherein said water-immiscible material is a petroleum wax.

13. The emulsion of claim 9 wherein said water-immiscible material is an asphalt.

14. The emulsion of claim 9 wherein the ethylene-crotonic acid copolymer salt is an alkali metal salt.

15. The emulsion of claim 9 wherein the ethylene-crotonic acid copolymer salt is an amine salt.

16. The emulsion of claim 9 wherein the ethylene-crotonic acid copolymer salt is the ammonium salt.

17. A process for forming an emulsion of water-immiscible organic material in water which comprises mixing (1) a water-immiscible organic material selected from the group consisting of oil, wax, asphalt and synthetic resin in a flowable state with (2) water and (3) an emulsifying agent selected from the group consisting of (a) an ethylene-crotonic acid copolymer salt having a number average osmotic molecular weight from about 500 to 15,000 and containing about 15% to 40% by weight of polymerized crotonic acid content as the salt of a neutralizing agent selected from the group consisting of alkali metal hydroxide, ammonium hydroxide and organic amine and (b) an ethylene-crotonic acid copolymer salt having a number average osmotic molecular weight from about 500 to 15,000 and containing about 5% to 15% by weight of polymerized crotonic acid content as the salt of a neutralizing agent selected from the group consisting of alkali metal hydroxide, ammonium hydroxide and organic amine together with an additional emulsifying agent selected from the group consisting of anionic emulsifier and polyoxyethylene nonionic emulsifier, said ethylene-crotonic acid copolymer salt being present in an amount of at least about 20 weight percent based on the weight of water-immiscible organic material present.

18. A process for forming an emulsion of water-immiscible organic material in water which comprises mixing (1) a water-immiscible organic material selected from the group consisting of oil, wax, asphalt and synthetic resin in a flowable state with (2) water and (3) at least 20% by weight based on the amount of water-immiscible material present of an emulsifying agent which is an ethylene-crotonic acid copolymer salt having a number average osmotic molecular weight from about 500 to 15,000 and containing about 15% to 40% by weight of polymerized crotonic acid content as the salt of a neutralizing agent selected from the group consisting of alkali metal hydroxide ammonium hydroxide and organic amine.

19. A process for forming an emulsion of water-immiscible organic material in water which comprises mixing (1) a water-immiscible organic material selected from the group consisting of oil, wax, asphalt and synthetic resin in a flowable state with (2) water and (3) an emulsifying agent which is an ethylene-crotonic acid copolymer salt having a number average osmotic molecular weight from about 500 to 15,000 and containing about 5% to 15% by weight of polymerized crotonic acid as the salt of a neutralizing agent selected from the group consisting of alkali metal hydroxide, ammonium hydroxide and organic amine together with an additional emulsifying agent selected from the group consisting of anionic emulsifier and polyoxyethylene nonionic emulsifier, said ethylene-crotonic acid copolymer salt being present in an amount of at least about 20 weight percent based on the weight of water-immiscible organic material present.

20. The process of claim 17 wherein said water-immiscible material is a petroleum wax.

21. The process of claim 17 wherein said water-immiscible material is asphalt.

22. The process of claim 17 wherein ethylene-cronotic acid copolymer salt is an alkali metal salt.

23. The process of claim 17 wherein the ethylene-crotonic acid polymer salt is an amine salt.

24. The process of claim 17 wherein the ethylene-crotonic acid copolymer salt is the ammonium salt.

References Cited

UNITED STATES PATENTS 3,321,408   5/1967   Briggs _____ 252—161

MORRIS LIEBMAN, *Primary Examiner.*

H. S. KAPLAN, *Assistant Examiner.*